US009467571B2

(12) United States Patent
Ahgren

(10) Patent No.: US 9,467,571 B2
(45) Date of Patent: Oct. 11, 2016

(54) ECHO REMOVAL

(71) Applicant: Microsoft Technology Licensing, LLC, Redmond, WA (US)

(72) Inventor: Per Ahgren, Knivsta (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 14/012,458

(22) Filed: Aug. 28, 2013

(65) Prior Publication Data

US 2014/0357323 A1    Dec. 4, 2014

(30) Foreign Application Priority Data

May 31, 2013    (GB) .................................. 1309773.8

(51) Int. Cl.
H04B 3/20 (2006.01)
H04M 9/08 (2006.01)

(52) U.S. Cl.
CPC ..................... H04M 9/082 (2013.01)

(58) Field of Classification Search
USPC .................................................... 379/406.01
See application file for complete search history.

(56) References Cited

U.S. PATENT DOCUMENTS

| | | | |
|---|---|---|---|
| 3,787,645 A | 1/1974 | Ochiai et al. | |
| 4,918,727 A | 4/1990 | Rohrs et al. | |
| 4,977,591 A | 12/1990 | Chen et al. | |
| 5,157,653 A | 10/1992 | Genter | |
| 5,187,692 A | 2/1993 | Haneda et al. | |
| 5,305,307 A | 4/1994 | Chu | |
| 5,559,881 A | 9/1996 | Sih | |
| 5,587,998 A * | 12/1996 | Velardo, Jr. ............ | H04B 3/237 370/289 |
| 5,631,900 A | 5/1997 | McCaslin et al. | |
| 5,661,795 A | 8/1997 | Maeda | |
| 5,796,819 A | 8/1998 | Romesburg | |
| 5,822,275 A | 10/1998 | Michalski | |
| 5,852,661 A | 12/1998 | Chen | |
| 5,995,620 A | 11/1999 | Wigren | |
| 6,212,273 B1 | 4/2001 | Hemkumar | |

(Continued)

FOREIGN PATENT DOCUMENTS

EP    1978649    10/2008
WO    WO-2011133075    10/2011

(Continued)

OTHER PUBLICATIONS

"Supplemental Notice of Allowance", U.S. Appl. No. 14/015,998, filed Sep. 30, 2015, 2 pages.

(Continued)

*Primary Examiner* — Duc C Ho
(74) *Attorney, Agent, or Firm* — Tom Wong; Micky Minhas

(57) ABSTRACT

Echo removal techniques are described. An echo path of the echo in a received audio signal is modelled using a first model to determine a first model estimate of the echo. The first model estimate is used to determine a first performance value according to a performance metric. The first performance value is compared with a threshold value. It is determined if the echo path can be deemed linear based on the comparison. If so, the first model estimate of the echo is used to remove the echo in the received audio signal. Otherwise, the echo path of the echo is switched to be modelled using a second model to determine a second model estimate of the echo, and the second model estimate of the echo is used to remove the echo in the received audio signal.

20 Claims, 4 Drawing Sheets

(56) References Cited

U.S. PATENT DOCUMENTS

| | | | |
|---|---|---|---|
| 6,415,029 B1 | 7/2002 | Piket et al. | |
| 6,507,652 B1 | 1/2003 | Laberteaux | |
| 6,563,803 B1 | 5/2003 | Lee | |
| 6,597,787 B1 * | 7/2003 | Lindgren | H04B 3/21 379/406.01 |
| 6,606,382 B2 | 8/2003 | Gupta | |
| 6,836,547 B2 | 12/2004 | Tahernezhaadi | |
| 6,928,161 B1 | 8/2005 | Graumann | |
| 6,944,289 B2 | 9/2005 | Tahernezhaadi et al. | |
| 6,990,195 B1 | 1/2006 | Leblanc et al. | |
| 7,003,099 B1 | 2/2006 | Zhang et al. | |
| 7,054,437 B2 | 5/2006 | Enzner | |
| 7,054,451 B2 | 5/2006 | Janse et al. | |
| 7,139,342 B1 * | 11/2006 | Phanse | H04B 3/23 375/350 |
| 7,388,954 B2 | 6/2008 | Pessoa et al. | |
| 7,433,463 B2 | 10/2008 | Alves et al. | |
| 7,684,559 B2 | 3/2010 | Hoshuyama | |
| 7,773,743 B2 | 8/2010 | Stokes et al. | |
| 7,860,235 B2 | 12/2010 | Sudo et al. | |
| 8,064,966 B2 | 11/2011 | Herve et al. | |
| 8,175,261 B2 | 5/2012 | Gough et al. | |
| 8,213,596 B2 | 7/2012 | Beaucoup et al. | |
| 8,280,037 B2 | 10/2012 | Takada | |
| 8,515,054 B2 | 8/2013 | LeBlanc et al. | |
| 8,619,970 B2 | 12/2013 | Nagy | |
| 8,687,797 B2 | 4/2014 | Zeng et al. | |
| 9,277,059 B2 | 3/2016 | Ahgren | |
| 2002/0054685 A1 | 5/2002 | Avendano et al. | |
| 2002/0075818 A1 * | 6/2002 | Matsuo | H04B 7/2618 370/280 |
| 2003/0123674 A1 | 7/2003 | Boland | |
| 2003/0174661 A1 | 9/2003 | Lee | |
| 2003/0185402 A1 | 10/2003 | Benesty et al. | |
| 2003/0235312 A1 | 12/2003 | Pessoa et al. | |
| 2004/0071207 A1 | 4/2004 | Skidmore et al. | |
| 2004/0125944 A1 | 7/2004 | Popovic et al. | |
| 2004/0161101 A1 | 8/2004 | Yiu et al. | |
| 2004/0247111 A1 | 12/2004 | Popovic et al. | |
| 2005/0123033 A1 | 6/2005 | Pessoa et al. | |
| 2005/0169458 A1 | 8/2005 | Johnston et al. | |
| 2006/0007872 A1 | 1/2006 | Liu | |
| 2006/0018460 A1 | 1/2006 | McCree | |
| 2006/0147032 A1 | 7/2006 | McCree et al. | |
| 2007/0280472 A1 | 12/2007 | Stokes et al. | |
| 2008/0240413 A1 | 10/2008 | Mohammad et al. | |
| 2009/0116638 A1 | 5/2009 | Gough et al. | |
| 2010/0208908 A1 | 8/2010 | Hoshuyama | |
| 2010/0215185 A1 | 8/2010 | Christoph | |
| 2010/0246804 A1 | 9/2010 | Prakash et al. | |
| 2010/0278067 A1 * | 11/2010 | LeBlanc | H04B 3/23 370/252 |
| 2010/0303228 A1 | 12/2010 | Zeng et al. | |
| 2011/0033059 A1 | 2/2011 | Bhaskar et al. | |
| 2011/0058667 A1 | 3/2011 | Takada | |
| 2011/0081026 A1 | 4/2011 | Ramakrishnan et al. | |
| 2011/0158363 A1 | 6/2011 | Andersen et al. | |
| 2011/0261949 A1 | 10/2011 | Dyba et al. | |
| 2012/0250872 A1 | 10/2012 | Leblanc et al. | |
| 2012/0290525 A1 | 11/2012 | Malik et al. | |
| 2014/0064476 A1 | 3/2014 | Mani et al. | |
| 2014/0357324 A1 | 12/2014 | Ahgren | |
| 2014/0357325 A1 | 12/2014 | Ahgren | |
| 2014/0357326 A1 | 12/2014 | Ahgren | |

FOREIGN PATENT DOCUMENTS

| | | |
|---|---|---|
| WO | WO-2012109385 | 8/2012 |
| WO | WO-2012166092 | 12/2012 |

OTHER PUBLICATIONS

"Supplemental Notice of Allowance", U.S. Appl. No. 14/012,867, filed Oct. 29, 2015, 2 pages.

"Notice of Allowance", U.S. Appl. No. 14/012,867, filed Oct. 5, 2015, 6 pages.

"Second Written Opinion", Application No. PCT/US2014/039869, May 6, 2015, 4 pages.

"Second Written Opinion", Application No. PCT/US2014/039871, May 7, 2015, 4 pages.

"SEA2M™ Speech Enhancement Algorithms for Array of Microphones", In White Paper of NIIT MICRONAS, Retrieved from <http://www.rt-rk.com/white_papers/rt-rk_wp_sea2m.pdf>,(Nov. 2006), 33 pages.

Bendersky, et al., "Nonlinear Residual Acoustic Echo Suppression for High Levels of Harmonic Distortion", In International Conference on Acoustics, Speech and Signal Processing, Retrieved from <http://research.microsoft.com/pubs/69504/diegobenderskyhdres.pdf>,(Apr. 2008), 4 pages.

Breining, et al., "Acoustic Echo Control—An Application of Very-High-Order Adaptive Filters", In IEEE Signal Processing Magazine, Retrieved from <http://ieeexplore.ieee.org/stamp/stamp.jsp?tp=&arnumber=774933>,(Jul. 1999), 28 pages.

Dyba, et al., "Network Echo Cancellers and Freescale Solutions Using the StarCore™ SC140 Core", Retrieved from <http://cache.freescale.com/files/dsp/doc/app_note/AN2598.pdf>, (Nov. 2004), 48 pages.

Gansler, et al., "Double-Talk Robust Fast Converging Algorithms for Network Echo Cancellation", In IEEE Transactions on Speech and Audio Processing, Volume 8, Issue 6, Retrieved from <http://extreme.emt.inrs.ca/users/benesty/papers/sap_nov2000.pdf>, (Nov. 2000), 8 pages.

Ghose, et al., "A Double-talk Detector for Acoustic Echo Cancellation Applications", In Journal of Signal Processing, Volume 80, Issue 8, Retrieved from http://citeseerx.ist.psu.edu/viewdoc/download?doi=10.1.1.59.800&rep=rep1&type=pdf>, (Aug. 2000), 9 pages.

Hoshuyama, et al., "An Acoustic Echo Suppressor Based on a Frequency-Domain Model of Highly Nonlinear Residual Echo", In IEEE International Conference on Acoustics, Speech and Signal Processing, Retrieved from <http://ieeexplore.ieee.org/stamp.jsp?tp=&arnumber=1661264>, (May 14, 2006), 4 pages.

Gupta, et al., "Nonlinear Acoustic Echo Control Using an Accelerometer", Retrieved at <<http://enpub.fulton.asu.edu/sensip/SenSIP_Papers/Non_linear_echo_cancellation.pdf>>, In Proceedings of the IEEE International Conference on Acoustics, Speech and Signal Processing, Apr. 19, 2009, pp. 4.

Stenger, et al., "Nonlinear Acoustic Echo Cancellation with 2nd Order Adaptive Volterra Filters", Retrieved at <<http://ieeexplore.ieee.org/xpls/abs_all.jsp?arnumber=759811>>, In Proceedings of IEEE International Conference on Acoustics, Speech and Signal Processing, Mar. 15, 1999, pp. 4.

"Nonlinear Acoustic Echo Cancellation", Retrieved at <<http://www.lms.Int.de/research/activity/audio/sign/nlaec/>>, Retrieved date: Jan. 22, 2013, pp. 3.

"International Search Report and Written Opinion", Application No. PCT/US2014/039871, Aug. 29, 2014, 10 pages.

"International Search Report and Written Opinion", Application No. PCT/US2014/039873, Sep. 1, 2014, 10 pages.

"International Search Report and Written Opinion", Application No. PCT/US2014/039869, Aug. 26, 2014, 9 pages.

"International Search Report and Written Opinion", Application No, PCT/US2014/039872, Sep. 8, 2014, 9 pages.

Azpicueta-Ruiz, et al.,' "Novel Schemes for Nonlinear Acoustic Echo Cancellation Based on Filter Combinations", 2009 IEEE, Apr. 19, 2009, pp. 193-196.

"International Preliminary Report on Patentability", Application No. PCT/US2014/039869, Sep. 9, 2015, 11 pages.

"International Preliminary Report on Patentability", Application No. PCT/US2014/039872, Sep. 9, 2015, 11 pages.

"International Preliminary Report on Patentability", Application No. PCT/US2014/039871, Jul. 20, 2015, 6 pages.

"International Preliminary Report on Patentability", Application No. PCT/US2014/039873, Sep. 4, 2015, 6 pages.

(56) References Cited

OTHER PUBLICATIONS

"Notice of Allowance", U.S. Appl. No. 14/015,998, filed Aug. 27, 2015, 2 pages.
"Second Written Opinion", Application No. PCT/US2014/039873, May 7, 2015, 5 pages.
"Ex Parte Quayle Action", U.S. Appl. No. 14/015,998, filed Mar. 13, 2015, 6 pages.
"Non-Final Office Action", U.S. Appl. No. 14/012,867, filed Jun. 3, 2015, 9 pages.
"Notice of Allowance", U.S. Appl. No. 14/015,998, filed Jun. 4, 2015, 4 pages.
"Non-Final Office Action", U.S. Appl. No. 14/012,786, filed Jan. 15, 2016, 12 pages.
"Final Office Action", U.S. Appl. No. 14/012,786, filed May 9, 2016, 13 pages.
"Supplemental Notice of Allowance", U.S. Appl. No. 14/012,867, filed Jan. 7, 2016, 3 pages.
Notice of Allowance, U.S. Appl. No. 14/012,786, Aug. 25, 2016, 9 pages.

\* cited by examiner

ECHO REMOVAL

RELATED APPLICATION

This application claims priority under 35 USC 119 or 365 to Great Britain Application No. 1309773.8 filed May 31, 2013, the disclosure of which is incorporate in its entirety.

BACKGROUND

A device may have audio input apparatus that can be used to receive audio signals from the surrounding environment. The device may also have audio output apparatus that can be used to output audio signals to the surrounding environment. For example, a device may have one or more speakers for outputting audio signals and one or more microphones for receiving audio signals. Audio signals which are output from the speaker(s) of the device may be received as "echo" in the audio signal received by the microphone(s). It may be the case that this echo is not desired in the received audio signal. For example, the device may be a user device (such as a mobile phone, tablet, laptop, PC, etc) which is used in a communication event, such as an audio or video call, with another user device over a network. Far-end signals of the call may be output from the speaker at the user device and may be received as echo in the audio signals received by the microphone at the device. Such echo can be disturbing to users of the call, and the perceived quality of the call may be reduced due to the echo. In particular, the echo may cause interference for near-end audio signals which are intended to be received by the microphone and transmitted to the far-end in the call. Therefore echo cancellation and/or echo suppression may be applied to the received audio signals to thereby suppress the echo in the received audio signal. The power of the echo in the received audio signal may vary depending upon the arrangement of the user device. For example, the user device may be a mobile phone and in that case, the power of the echo in the received audio signal would normally be higher when the mobile phone is operating in a "hands-free" mode compared to when the mobile phone is not operating in a "hands-free" mode.

Echo cancellation (or "echo subtraction") techniques aim to estimate an echo signal included in the audio signal received at the microphone, based on knowledge of the audio signal which is output from the speaker. The estimate of the echo signal can then be subtracted from the received audio signal thereby removing at least some of the echo from the received audio signal. Echo suppression is used to apply frequency-dependent suppression to the received audio signal to thereby suppress the echo in the received audio signal.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of removing echo in a received audio signal. As part of the echo removal, an echo path of the echo in the received audio signal is modelled using a first model to determine a first model estimate of the echo in the received audio signal. The first model estimate is used to determine a first performance value of the echo path according to a performance metric. The first performance value is compared with a threshold value. It is then determined if the echo path can be deemed linear based on the comparison. If the echo path can be deemed linear, the first model estimate of the echo is used to remove the echo in the received audio signal. Otherwise, the echo path of the echo in the received audio signal is modelled using a second model based on the outputted audio signal and the received audio signal to determine a second model estimate of the echo, and the second model estimate of the echo is used to remove the echo in the received audio signal.

The method may be used in a call (e.g. a call implementing voice over internet protocol (VoIP) to transmit audio data between user devices) in which case the outputted audio signal may be a far-end signal received from the far-end of the call, and the received signal includes the resulting echo and a near-end signal for transmission to the far-end of the call.

BRIEF DESCRIPTION OF THE DRAWINGS

For a better understanding of the described embodiments and to show how the same may be put into effect, reference will now be made, by way of example, to the following drawings in which.

DETAILED DESCRIPTION

Embodiments will now be described by way of example only.

Figure 1:
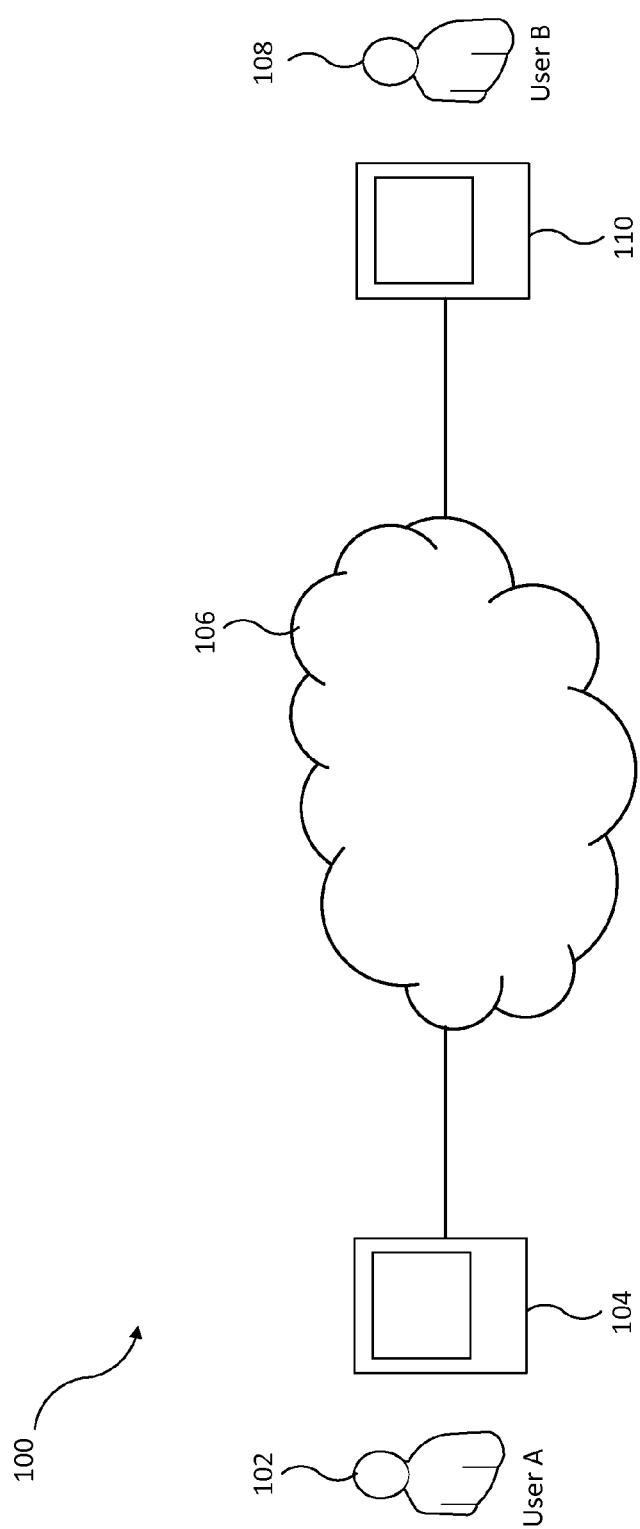
FIG. 1 shows a schematic illustration of a communication system.

FIG. 1 shows a communication system 100 comprising a first user 102 ("User A") who is associated with a first user device 104 and a second user 108 ("User B") who is associated with a second user device 110. In other embodiments the communication system 100 may comprise any number of users and associated user devices. The user devices 104 and 110 can communicate over the network 106 in the communication system 100, thereby allowing the users 102 and 108 to communicate with each other over the network 106. The communication system 100 shown in FIG. 1 is a packet-based communication system, but other types of communication system could be used. The network 106 may, for example, be the Internet. Each of the user devices 104 and 110 may be, for example, a mobile phone, a tablet, a laptop, a personal computer ("PC") (including, for example, Windows™, Mac OS™ and Linux™ PCs), a gaming device, a television, a personal digital assistant ("PDA") or other embedded device able to connect to the network 106. The user device 104 is arranged to receive information from and output information to the user 102 of the user device 104. The user device 104 comprises output means such as a display and speakers. The user device 104 also comprises input means such as a keypad, a touch-screen, a microphone for receiving audio signals and/or a camera for capturing images of a video signal. The user device 104 is connected to the network 106.

The user device 104 executes an instance of a communication client, provided by a software provider associated with the communication system 100. The communication client is a software program executed on a local processor in the user device 104. The client performs the processing required at the user device 104 in order for the user device 104 to transmit and receive data over the communication system 100.

The user device 110 corresponds to the user device 104 and executes, on a local processor, a communication client which corresponds to the communication client executed at the user device 104. The client at the user device 110 performs the processing required to allow the user 108 to communicate over the network 106 in the same way that the client at the user device 104 performs the processing required to allow the user 102 to communicate over the network 106. The user devices 104 and 110 are endpoints in the communication system 100. FIG. 1 shows only two users (102 and 108) and two user devices (104 and 110) for clarity, but many more users and user devices may be included in the communication system 100, and may communicate over the communication system 100 using respective communication clients executed on the respective user devices.

Figure 2:
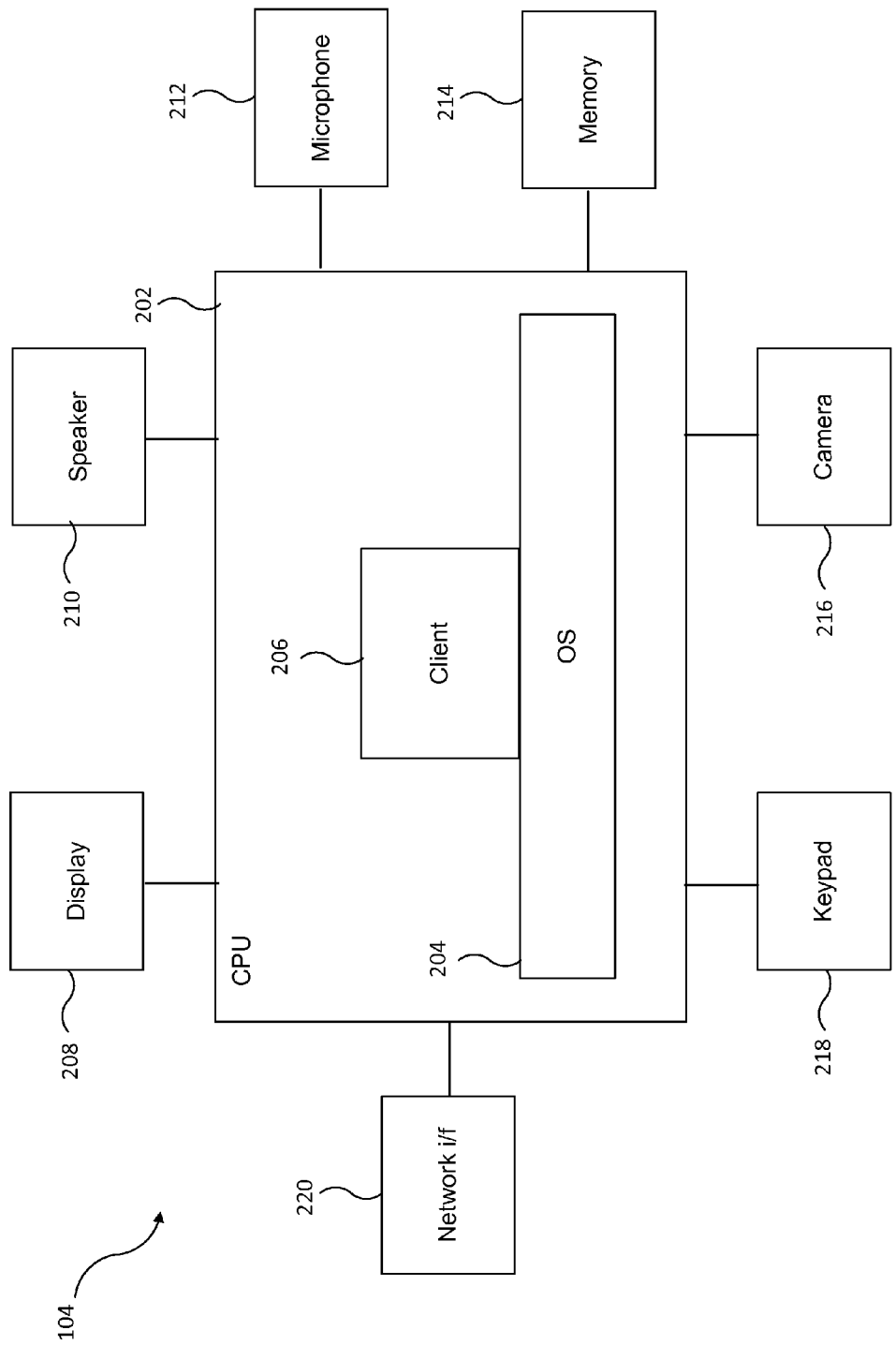
FIG. 2 is a schematic block diagram of a user device.

FIG. 2 illustrates a detailed view of the user device 104 on which is executed a communication client instance 206 for communicating over the communication system 100. The user device 104 comprises a central processing unit ("CPU") or "processing module" 202, to which is connected: output devices such as a display 208, which may be implemented as a touch-screen, and a speaker (or "loudspeaker") 210 for outputting audio signals; input devices such as a microphone 212 for receiving audio signals, a camera 216 for receiving image data, and a keypad 218; a memory 214 for storing data; and a network interface 220 such as a modem for communication with the network 106. The user device 104 may comprise other elements than those shown in FIG. 2. The display 208, speaker 210, microphone 212, memory 214, camera 216, keypad 218 and network interface 220 may be integrated into the user device 104 as shown in FIG. 2. In alternative user devices one or more of the display 208, speaker 210, microphone 212, memory 214, camera 216, keypad 218 and network interface 220 may not be integrated into the user device 104 and may be connected to the CPU 202 via respective interfaces. One example of such an interface is a USB interface. If the connection of the user device 104 to the network 106 via the network interface 220 is a wireless connection then the network interface 220 may include an antenna for wirelessly transmitting signals to the network 106 and wirelessly receiving signals from the network 106.

FIG. 2 also illustrates an operating system ("OS") 204 executed on the CPU 202. Running on top of the OS 204 is the software of the client instance 206 of the communication system 100. The operating system 204 manages the hardware resources of the computer and handles data being transmitted to and from the network 106 via the network interface 220. The client 206 communicates with the operating system 204 and manages the connections over the communication system. The client 206 has a client user interface which is used to present information to the user 102 and to receive information from the user 102. In this way, the client 206 performs the processing required to allow the user 102 to communicate over the communication system 100.

In acoustic echo cancellation the aim is to remove the echo signal s(t) in the microphone signal y(t) originating from the loudspeaker signal x(t). This should be done as exact as possible and as non-obtrusively as possible in order to have as little impact on the perception of any near-end signal v(t). The microphone signal can be written as y(t)=s(t)+v(t). The echo signal is a function of the loudspeaker signal as s(t)=F(x(t)).

There are two main ways to achieve the above, one being echo subtraction and the other being echo suppression. Often these two approaches are combined.

Both of these echo removal methods require a model of the echo path to be estimated. A multitude of models may be used to model the echo path and depending on what model is used, the model may be more or less suited for the echo paths at hand. One example is when a linear FIR model is used to model the echo path. This model type is well suited for echo cancellation when the echo path is fairly linear. However, when the echo path is rather nonlinear it typically performs poorly.

Figure 3:
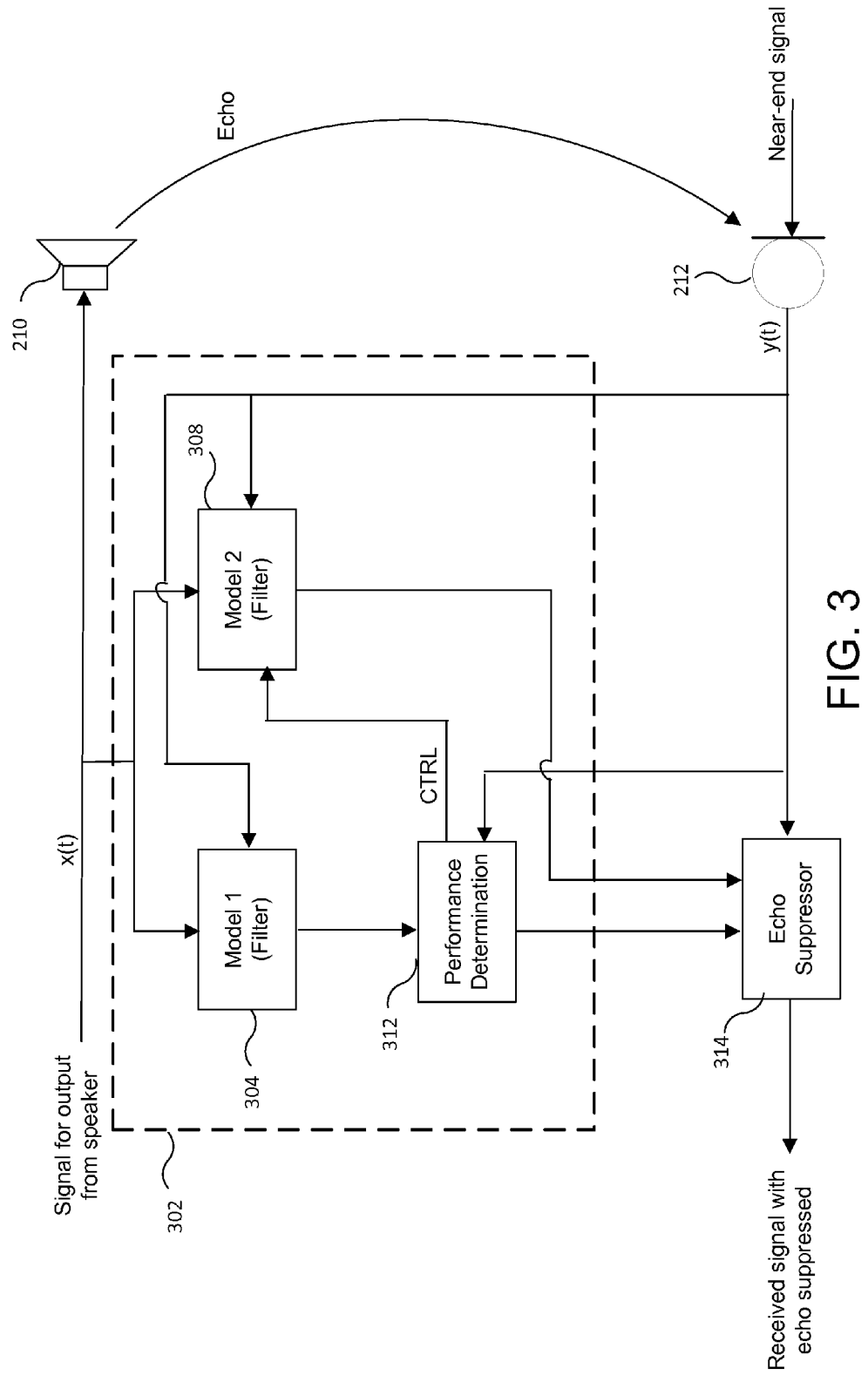
FIG. 3 is a functional diagram showing modules of a user device for use in echo removal.
Figure 4:
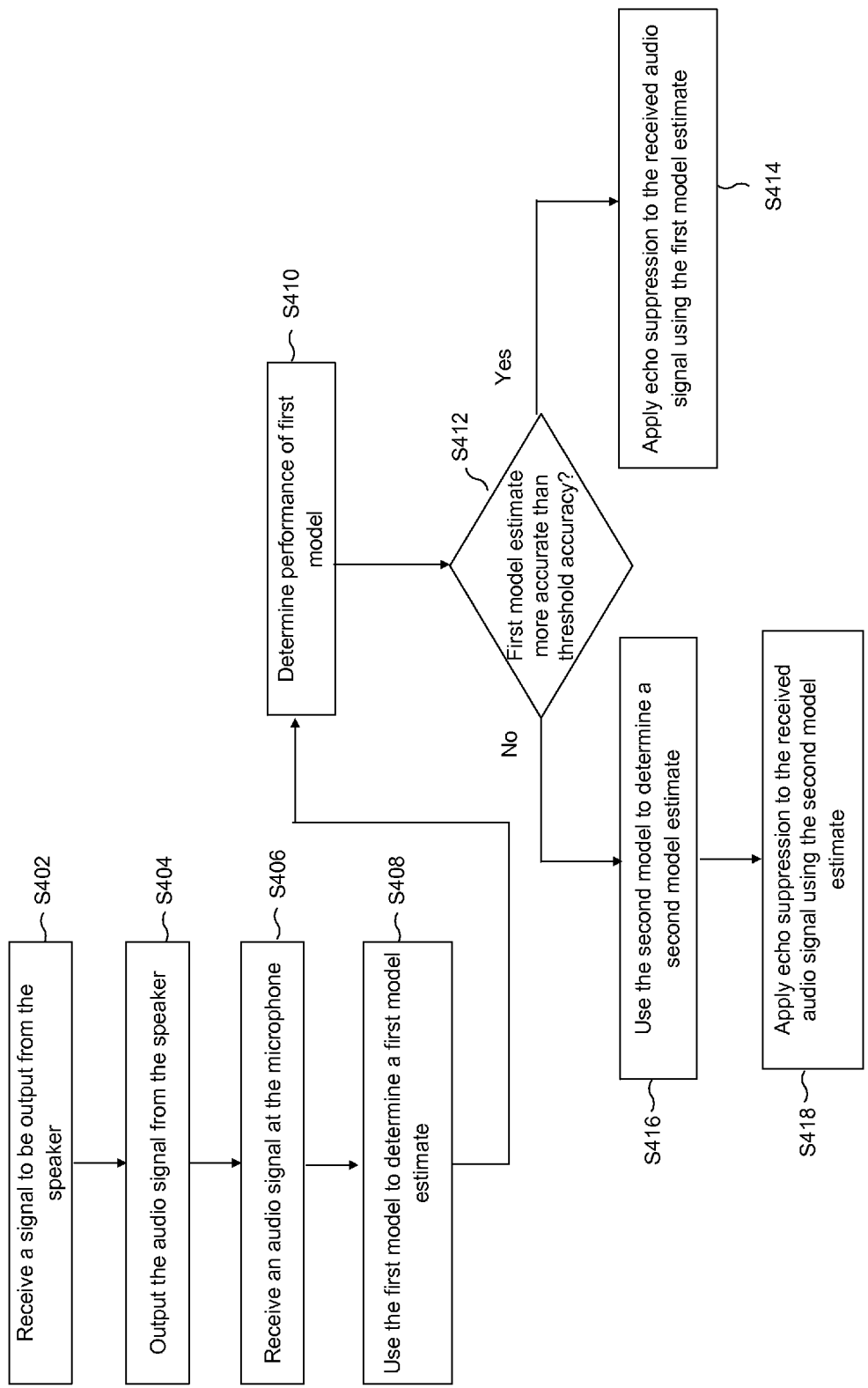
FIG. 4 is a flow chart for a process of removing echo.

With reference to FIGS. 3 and 4 there is now described a method of removing echo. FIG. 3 is a functional diagram of a part of the user device 104 showing how an echo removal process is implemented.

As shown in FIG. 3, the user device 104 comprises the speaker 210, the microphone 212, a modelling module 302, and an echo removal module 314. The modelling module 302 comprises a first filter module 304, a second filter module 308, and a performance determination module 312. The echo removal module 314 is described with reference to FIG. 3 as an echo suppression module 314.

FIG. 4 is a flow chart for the process of suppressing echo.

A signal x(t) to be output from the speaker 210 is coupled to an input of the speaker 210. It should be noted that in the embodiments described herein there is just one speaker (indicated by reference numeral 210 in the figures) but in other embodiments there may be more than one speaker to which the signal to be outputted is coupled (for outputting therefrom). Similarly, in the embodiments described herein there is just one microphone (indicated by reference numeral 212 in the figures) but in other embodiments there may be more than one microphone which receive audio signals from the surrounding environment. The signal to be output from the speaker 210 is also coupled to the modelling module 302. In particular, the signal to be output from the speaker 210 is coupled to a first input of the first filter module 304 and to a first input of the second filter module 308. An output of the microphone 212 is coupled to the modelling module 302. In particular, the output of the microphone 212 is coupled to a second input of the first filter module 304 and to a second input of the second filter module 308. Outputs of the modelling module 302 are coupled to the echo suppression module 314. In particular an output of the performance determination module 312 is coupled to a first input of the echo suppression module 314, and an output of the second filter module 308 is coupled to a second input of echo suppression module 314. An output of the first filter module 304 is coupled to a first input of the performance determination module 312. The output of the microphone 212 is coupled to a second input of the performance determination module 312. An output of the performance determination module 312 is coupled to a third input of the second filter module 308. The output of the microphone 212 is also coupled to a third input of the echo suppression module 314. An output of the echo suppression module 314 is used to provide the received signal (with echo suppression having been applied) for further processing in the user device 104.

In step S402 a signal is received which is to be outputted from the speaker 210. For example, the signal to be outputted may be a far-end signal that has been received at the user device 104 from the user device 110 during a call between the users 102 and 108 over the communication system 100. Any processing that is required to be performed on the received signal (e.g. decoding using a speech codec, depacketizing, etc) is performed as is known in the art (e.g. by the client 206) to arrive at the signal x(t) which is suitable to be outputted from the speaker 210. The signal x(t) is a digital signal. At least some of the processing of the signal in the user device 104 prior to outputting the signal from the speaker 210 is performed in the digital domain. As is known in the art, a digital to analogue converter (DAC) is applied to the digital signal x(t) before playout from the loudspeaker 210. Similarly, an analogue to digital converter (ADC) is applied to the signal captured by the microphone 212 to arrive at the digital signal y(t).

In other embodiments, the signal to be outputted may be received from somewhere other than over the communication system 100 in a call. For example, the signal to be outputted may have been stored in the memory 214 and step S402 may comprise retrieving the signal from the memory 214.

In step S404 the audio signal x(t) is outputted from the speaker 210. In this way the audio signal x(t) is outputted to the user 102.

In step S406 the microphone 212 receives an audio signal. As shown in FIG. 3 the received audio signal may include a near-end signal which is a desired signal or "primary signal". The near-end signal is the signal that the user 102 intends the microphone 212 to receive. However, the received audio signal also includes an echo signal resulting from the audio signals outputted from the speaker 210 in step S404. The received audio signal may also include noise, such as background noise. Therefore, the total received audio signal y(t) can be given by the sum of the near-end signal, the echo and the noise. The echo and the noise act as interference for the near-end signal.

The first filter module 304 takes as inputs the outputted audio signal x(t) and the received audio signal y(t). In step S408, the first filter module 304 is used to model the echo in the received audio signal y(t). In particular, the first filter module 304 is operable to model the echo path of the echo in the received audio signal y(t) using the outputted audio signal x(t) and the received audio signal y(t) to determine an estimate of the echo component in the near end signal y(t)

The first filter module 304 may utilise any linear filter (e.g. a Finite Impulse Response (FIR) filter or an Infinite impulse Response (IIR) filter) to model the echo path of the echo in the received audio signal. Thus the first filter module 304 is well suited for echo cancellation when the echo path is fairly linear.

The echo path describes the effects of the acoustic paths travelled by the far end signal from the speaker 210 to the microphone 212. The far end signal may travel directly from the speaker 210 to the microphone 212, or it may be reflected from various surfaces in the environment of the near end terminal. The echo path traversed by the far end signal output from the speaker 210 may be regarded as a system having a frequency and a phase response which may vary over time.

In order to remove the acoustic echo s(t) from the signal y(t) recorded at the near-end microphone 212 it is necessary to estimate how the echo path changes the desired far-end speaker output signal x(t) to an undesired echo component in the input signal.

For an approximately linear echo path, the echo path h(t) describes how the echo in the received audio signal y(t) relates to the audio signal x(t) output from the speaker 210, e.g. according to the equation: $s(t)=\Sigma_{n=0}^{N_{true}} h_n(t)x(t-n)$, where s(t) is the echo in the received audio signal y(t), $N_{true}$ is a sufficiently large number to cover the non-negligible parts of the impulse response (theoretically $N_{true}$ is infinite), and $h_n(t)$ are the coefficients of the impulse response describing the echo path h(t). The echo path h(t) may vary in both time and frequency and may be referred to herein as h(t) or h(t,f). The echo path h(t) may depend upon (i) the current environmental conditions surrounding the speaker 210 and the microphone 212 (e.g. whether there are any physical obstructions to the passage of the audio signal from the speaker 210 to the microphone 212, the air pressure, temperature, wind, etc), and (ii) characteristics of the speaker 210 and/or the microphone 212 which may alter the signal as it is outputted and/or received.

The filter module 304 models the echo path h(t) of the echo in the received audio signal y(t) by determining a weighted sum of the current and a finite number (N) of previous values of the outputted audio signal x(t). The filter module 304 therefore implements an Nth order filter which has a finite length (in time) over which it considers the values of the outputted audio signal x(t) in determining the estimate of the echo path $\hat{h}(t)$. In this way, the filter module 304 dynamically adapts the filter estimate of the echo path $\hat{h}(t)$. The operation is described by the following equation, which defines the echo in the received audio signal y(t) in terms of the outputted audio signal x(t): $\hat{s}_1(t)=\Sigma_{n=0}^{N} \hat{h}_n(t)x(t-n)$. Therefore N+1 samples of the outputted audio signal x(t) are used, with a respective N+1 weights $\hat{h}_n(t)$. The set of N+1 weights $\hat{h}_n(t)$ is referred to herein simply as the estimate of the echo path $\hat{h}(t)$. In other words the estimate of the echo path $\hat{h}(t)$ is a vector having N+1 values where the filter module 304 implements an Nth order filter, taking N+1 values (e.g. N+1 frames) of the signal x(t) into account.

It can be appreciated that it is easier to adapt the filter estimate of the echo path $\hat{h}(t)$ when the echo is a dominant part of the received audio signal, that is when y(t)≅s(t). However, it may be possible to adapt the filter estimate of the echo path $\hat{h}(t)$ even when the echo is not a dominant part of the received audio signal y(t) if the echo s(t) is independent of the other signal components of y(t).

It will be appreciated by one skilled in the art that the estimate of the echo path $\hat{h}(t)$ does not need to be explicitly calculated, but could be represented by means of filter coefficients obtained from stochastic gradient algorithms such as Least Mean Squares (LMS), Normalized Least Mean Squares (NLMS), Fast Affine Projection (FAP) and Recursive Least Squares (RLS).

The estimate of the echo path $\hat{h}(t)$ is used to provide filter coefficients that filter the far end signal x(t) to generate an estimate of the echo component in the near end signal y(t) in accordance with the estimate of the echo path $\hat{h}(t)$. Regardless of the particular algorithm used, the filter coefficients of the first filter module 304 are updated with each iteration of the algorithm, thus the coefficients of the first filter module 302 are continually updated over time regardless of the signal conditions at hand.

Whilst the above description refers to the use of a time domain FIR model of the echo path to estimate the echo component in the near end signal y(t) it will be appreciated by those skilled in the art that this is just an example and not limiting in any way. That is, the first filter module 304 may operate to determine an estimate of the echo path $\hat{h}(t)$ and thus an estimate $\hat{s}_1(t)$ of the echo component in the near end signal y(t) in the time domain or in the frequency domain.

In some embodiments the estimate of the echo component is output from the first filter module 304 to the performance determination module 312 (as shown in FIG. 3).

In other embodiments, in step S408 the estimate of the echo component is passed from the first filter module 304 to a first power estimating module (not shown in FIG. 3). The first power estimating module estimates the echo power in the received audio signal based on the filter estimate (determined by the first filter module 304) and the far end signal x(t). There are many ways to do this that are known to persons skilled in the art and the scope of this disclosure is not limited to any particular method of determining an echo power estimate. In these embodiments the first power estimating module is arranged to output its corresponding echo power estimate to the performance determination module 312.

The performance determination module 312 takes as an input a first estimate $\hat{s}_1(t)$. The first estimate $\hat{s}_1(t)$ may be an estimate of the echo component output from the first filter module 304 or the power of the estimation error (y-s). The performance determination module 312 also takes as an input the received audio signal y(t).

In step S410, the performance determination module 312 measures the performance of the first filter module 304 based on the first estimate $\hat{s}_1(t)$ and the received audio signal y(t) according to a performance metric. The performance measurement is used to detect the linearity of the system. The performance determination module 312 may operate to measure the performance of the first filter module 304 in the time domain or in the frequency domain.

One performance metric used for measuring the performance of the first filter module 304 is the echo return loss enhancement (ERLE), which is a measure of the amount of reduction of the echo, the ERLE metric is defined as:

$$ERLE_k(t) = \frac{E[y(t)]^2}{E[\hat{s}_k(t) - y(t)]^2}$$

The ERLE metric may be measured in decibels (dB), according to the following equation (assuming that a base 10 logarithm is used i.e., log 10):

$$ERLE_k(t) = 10\log\frac{E[y(t)]^2}{E[\hat{s}_k(t) - y(t)]^2}$$

In the above equations, E[ ] is the expectation operator. The ERLE measure can, and typically is, applied to non-stationary signals. Therefore, in practice the expectation values are evaluated using short-time average values:

$$ERLE_k(t) = \frac{\sum_{k=0}^{K-1} y^2(t-k)}{\sum_{k=0}^{K-1} (\hat{s}(t-k) - y(t-k))^2}$$

The ERLE metric is a measure of the ability of the model estimate to model the microphone signal y(t). The ERLE metric is limited in the sense that it only assesses the model accuracy when the microphone signal mainly consists of echo. If that is not the case, the ERLE measurement may be low even though the model is accurate. However, if the ERLE measurement is high, it can only be due to the model being accurate. ERLE always gets higher when more echo is being removed, regardless of whether it is being measured in dB or not.

Performance metrics, other than the ERLE, may be used for measuring the performance of the first filter module 304. Examples of such other performance metrics are the magnitude of the estimation error:

$$\Sigma_{k=0}^{K-1}(\hat{s}(t-k)-y(t-k))^2$$

weighted ERLE measures such as:

$$ERLE_k(t) = \frac{\sum_{k=0}^{K-1} w_k y^2(t-k)}{\sum_{k=0}^{K-1} w_k(\hat{s}(t-k) - y(t-k))^2}$$

and signal similarity measures such as the cross correlation between $\hat{s}(t)$ and y(t):

$$\frac{E[y(t)\hat{s}(t)]^2}{E[\hat{s}_k(t)]^2 E[y(t)]^2}$$

Regardless of the performance metric used, the performance measurement based on the first estimate $\hat{s}_1(t)$ taken in step S410 may be determined periodically. For example, performance measurements based on the first estimate $\hat{s}_1(t)$ may be averaged over a predetermined number of samples of the audio signal x(t) and the received audio signal y(t) in a given time period to arrive at a final performance measurement. That is, step S410 may comprise determining the performance measurement based on the first estimate $\hat{s}_1(t)$ for each frame of the received audio signal y(t), however this is merely an example, and the performance measurement based on the first estimate $\hat{s}_1(t)$ taken in step S410 may be determined less, or more often than for each frame.

In step S412, the performance determination module 312 determines whether the echo path can be deemed linear (for a certain time and frequency) based on the performance measurement taken in step S410.

That is at step S412, the performance determination module 312 determines if the first estimate $\hat{s}_1(t)$ is more accurate than a threshold accuracy by comparing the performance measurement (taken in step S410 by the performance determination module 312) to a threshold value.

The threshold value indicates a threshold accuracy and the echo path can be deemed linear when the comparison indicates the first model estimate $\hat{s}_1(t)$ is more accurate than the threshold accuracy. This threshold value may be a predetermined threshold (for example 10 dB) or be signal dependent.

For some performance metrics, the performance measurement taken in step S410 increases when the estimation accuracy of the first filter module 304 increases. The ERLE is an example of this type of performance metric. When this type of performance metric is used, when the performance measurement is greater, than or equal to, the threshold value the process proceeds to step S41, and when the performance measurement is less than the threshold value the process proceeds to step S416.

For other performance metrics, the performance measurement taken in step S410 decreases when the estimation accuracy of the first filter module 304 increases. For instance, if the squared prediction error (y(t)−s(t))^2 is used as the performance metric. When this type of performance metric is used, when the performance measurement is less than the threshold value the process proceeds to step S414, and when the performance measurement is greater than or equal to the threshold value the process proceeds to step S416.

Regardless of the particular performance metric used, the process proceeds to step S414, when the performance determination module 312 determines that the linearity of the system is at a sufficient level such that the first filter module 304 would provide an accurate estimation of the echo path.

In step S414 the echo suppression module 314 uses the first estimate $\hat{s}_1(t)$ to apply echo suppression to the received audio signal y(t), thereby suppressing the echo in the received audio signal. The echo suppression performed at step S414 is described later.

Regardless of the particular performance metric used, the process proceeds to step S416, when the performance determination module 312 determines that the linearity of the system is not at a sufficient level such that the first filter module 304 would provide an accurate estimation of the echo path. In step 416, the performance determination module 312 does not output the first estimate $\hat{s}_1(t)$ to the echo suppression module 314. Instead, in step S416 the performance determination module 312 outputs a control signal to enable the second filter module 308. In response to the receiving this control signal from the performance determination module 314, the second filter module 308 commences modelling the echo path of the echo in the received audio signal y(t). It will therefore be appreciated that at any given point in time only one of the first filter module 304 and the second filter module 308 may be operational to model the echo path.

The second filter module 308 takes as inputs the outputted audio signal x(t) and the received audio signal y(t). The second filter module 308 is operable to model the echo path of the echo in the received audio signal y(t) using the outputted audio signal x(t) and the received audio signal y(t) to determine an estimate of the echo component in the near end signal y(t) in the same way as the first filter module 304 as described above.

In comparison with the first filter module 304, the second filter module 308 is a cruder model that is less sensitive to nonlinearities. That is, the second filter module 308 is more suited for echo cancellation when the echo path is rather nonlinear.

In some embodiments the estimate of the echo component is output from the second filter module 308 to the echo suppression module 314 (as shown in FIG. 3). In these embodiments the estimate of the echo component is supplied to the echo suppression module 314.

In other embodiments, in step S416 the estimate of the echo component is passed from the second filter module 308 to a second power estimating module (not shown in FIG. 3). The second power estimating module estimates the echo power in the received audio signal based on the filter estimate (determined by the second filter module 308) and the far end signal x(t). There are many ways to do this that are known to persons skilled in the art and the scope of this disclosure is not limited to any particular method of determining an echo power estimate. In these embodiments the second power estimating module 308 is arranged to output its corresponding echo power estimate to the echo suppression module 314.

The echo suppression module 314 takes as an input a second estimate $\hat{s}_2(t)$. The second estimate $\hat{s}_2(t)$ may be an estimate of the echo component output from the second filter module 308 or an echo power estimate output from the second power estimating module. In step S418 the echo suppression module 314 uses the second estimate $\hat{s}_2(t)$ to apply echo suppression to the received audio signal y(t), thereby suppressing the echo in the received audio signal. The echo suppression performed at step S418 is described later.

After step S414, the process continually monitors the performance of the first filter module 304 to determine whether to continue applying echo suppression using the first estimate $\hat{s}_2(t)$ or switch to commence modelling the echo path of the echo in the received audio signal y(t) using the second filter module 308 and use the estimate $\hat{s}_2(t)$ to apply echo suppression to the received audio signal y(t).

Similarly, after step S418, the process continually monitors the performance of the first filter module 304 to determine whether to continue applying echo suppression using the second estimate $\hat{s}_2(t)$ or switch to use the first estimate $\hat{s}_1(t)$ to apply echo suppression to the received audio signal y(t).

In the embodiments described above, the echo removal functionality relies on the second estimate $\hat{s}_2(t)$ to apply echo suppression to the received audio signal y(t) unless the comparison of the performance measurement taken in step S410 to the threshold value indicates the first estimate $\hat{s}_1(t)$ is more accurate than the threshold accuracy.

In the embodiments described above, the echo removal functionality switches from relying on the first filter module 304 to relying on the second filter module 308 as soon as the comparison of the performance measurement taken in step S410 to the threshold value indicates the first estimate $\hat{s}_1(t)$ is less accurate than the threshold accuracy. In alternative embodiments, the switch from the relying on the first filter module 304 to relying on the second filter module 308 only occurs when comparisons of the performance measurement taken in step S410 to the threshold value indicates that the first estimate $\hat{s}_1(t)$ has been less accurate than the threshold accuracy over a predetermined period of time i.e. for the whole duration of the predetermined period of time.

In the embodiments described above, the echo removal functionality switches from relying on the second filter module 308 to relying on the first filter module 304 as soon as the comparison of the performance measurement taken in step S410 to the threshold value indicates the first estimate $\hat{s}_1(t)$ is more accurate than the threshold accuracy. In alternative embodiments, the switch from the relying on the second filter module 308 to relying on the first filter module 304 only occurs when comparisons of the performance measurement taken in step S410 to the threshold value indicates that the first estimate $\hat{s}_1(t)$ has been more accurate than the threshold accuracy over a predetermined period of time i.e. for the whole duration of the predetermined period of time.

The scheme described above may be extended to be implemented for separate frequency sub-bands within a frequency range. That is, the outputted audio signal x(t) and received audio signal y(t) processed by the modelling module 302 are divided into a plurality of frequency sub-bands within a frequency range, and the performance measurement described above is implemented on a sub-band basis.

For example for a given time period, for each frequency sub-band the first filter module 304 models the echo path of the echo in the received audio signal y(t) using the outputted audio signal x(t) and the received audio signal y(t) to determine an estimate of the echo component in the near end signal y(t). The performance determination module 312 makes a measurement of the performance of the first filter module 304 based on the first estimate $\hat{s}_1(t)$ and the received audio signal y(t) according to a particular performance metric for each frequency sub-band. Each of these performance measurements is compared to the threshold value to determine whether the echo path in the respective frequency sub-band can be deemed linear (for a certain time and frequency). The performance determination module 312 can then determine whether the echo path in the given time period can be deemed linear based on the number of frequency sub-bands (that are within a certain frequency range) in which the echo path is deemed linear (and thus inherently on the number of frequency sub-bands in which the echo path is deemed non-linear). For example, the performance determination module 312 may determine that the echo path in the given time period is deemed linear if the number of frequency sub-bands less than 4 kHz in which the echo path is deemed linear is greater than the number of frequency sub-bands in which the echo path is deemed non-linear i.e. the majority of the frequency bands in the lower 4 kHz are deemed linear. In other implementations, the performance determination module 312 may only determine that the echo path in the given time period is deemed linear if a certain proportion of the frequency sub-bands bands (that are within a certain frequency range) are deemed linear. For example the performance determination module 312 may determine that the echo path in the given time period is deemed linear if 75% of the frequency sub-bands bands (that are within a certain frequency range) are deemed linear. It will be appreciated that these example values are used merely to illustrate the concepts and are not intended to be limiting in any way.

In other embodiments in which the scheme described above is extended to be implemented for separate frequency bands within a frequency range, once the performance determination module 312 has determined whether the echo path in the respective frequency sub-band can be deemed linear (for a certain time and frequency) the performance determination module 312 makes the decision as to whether to apply echo suppression to the received audio signal y(t) using the first model estimate $\hat{s}_1(t)$, or control the second filter module 308 to model the echo path of the echo in the received audio signal y(t) and use the second estimate $\hat{s}_2(t)$ to apply echo suppression to the received audio signal y(t), on a per frequency sub-band basis. Thus a possible scenario may arise that for a given time period, the first filter module 304 is used to model the echo path of the echo in the received audio signal y(t) for lower frequency bands within the frequency range and the second filter module 308 is used to model the echo path of the echo in the received audio signal y(t) for higher frequency bands within the frequency range.

The echo suppression performed at steps S414 and S418 is now described.

The purpose of the echo suppressor is to suppress the loudspeaker echo present in the microphone signal, e.g. in a VoIP client, to a level sufficiently low for it not to be noticeable/disturbing in the presence of the near-end sounds (non-echo sounds) picked up by the microphone 212. In order to be able to choose the proper amount of echo suppression an accurate model of the echo path is needed, and as described above this is provided by modelling the echo path using one of two models whereby a performance measurement of a respective model is used as a detector for when to switch between the two models to ensure that the most suitable model is used to model the echo path. The echo suppression module 314 is designed to apply signal dependent suppression that varies both over time and frequency to the received audio signal y(t). Echo suppression methods are known in the art. Furthermore, the echo suppression method applied by the echo suppression module 314 may be implemented in different ways. As such, the exact details of the echo suppression method are therefore not described in detail herein.

The echo suppression module 314 outputs the received signal, with the echo having been suppressed, for further processing at the user device 104. For example, the signal output from the echo suppression module 314 may be processed by the client 206 (e.g. encoded and packetized) and then transmitted over the network 106 to the user device 110 in a call between the users 102 and 108. Additionally or alternatively, the signal output from the echo suppression module 314 may be used for other purposes by the user device 104, e.g. the signal may be stored in the memory 214 or used as an input to an application which is executing at the user device 104.

As described above, the first filter module 304 is continually updated regardless of the signal conditions at hand. A step-size adjustment scheme may optionally be used in relation to the first filter module 304 in the embodiments described above.

As described above, the filter coefficients for the first filter module 304 may be obtained by executing a stochastic gradient algorithm. In particular the first filter module 304 executes a stochastic gradient algorithm to identify the coefficients of the filter module 304 that minimises an error signal e(t).

Updated filter coefficients for the filter module 304 are generated in response to the error signal e(t), the input signal x(t) and the previous filter coefficients.

The stochastic gradient algorithm operates in a time recursive manner. This means it does not instantaneously adapt to changes in the system, instead the algorithm iteratively converges to an approximation of the system over a finite time interval.

The filter coefficients of the first filter module 304 filter the far end signal x(t) to generate an estimate of the echo component in the near end signal y(t). The error signal e(t) is obtained by a subtractor (not shown in FIG. 3) which subtracts the first filter module's estimate of the echo component in the near end signal y(t) from the near end signal y(t) and supplies the error signal e(t) to the first filter module 304. It will be appreciated that it is desirable for the error signal e(t) to be small. For example, when there is no near end signal v(t) in the microphone signal, ideally the error signal is equal to zero.

Stochastic gradient algorithms have a convergence parameter in the form of a step-size for the update of the model parameters. This can in some applications be chosen as fixed but in many cases better performance is achieved if it is chosen in a signal-dependent manner. The step-size controls the sensitivity of the updating to the noise in the microphone signal y(t). If it is chosen to be small, the update speed is slow but is less insensitive to the noise, but if it is chosen to be large the update speed is instead rapid but more sensitive to the noise. The reference to "update speed" or "adaptation speed" used herein is used to refer to how quickly the model is able to adapt to the signal conditions at hand in the system. That is, using a smaller step-size will result in a smaller eventual error signal e(t), however convergence to an approximation of the system will be slower due the greater number of iteration steps required (slower convergence rate), and using a larger step-size will result in a larger eventual error signal e(t), however convergence to an approximation of the system will be quicker due the fewer number of iteration steps required (faster convergence rate).

In order to achieve estimates of very high accuracy the step-size needs to be small in order to avoid overshooting the true estimates due to too high step size.

In the step-size adjustment scheme, the accuracy of the estimate $\hat{s}_1(t)$ is determined according to an echo return loss enhancement measurement. This echo return loss enhancement measurement may be the same accuracy measurement made by the performance determination module 312 in step S410. Alternatively this echo return loss enhancement measurement may be a separate measurement to the accuracy measurement made by the performance determination module 312 when measures other than ERLE are used in step S410.

A convergence parameter selection module (not shown in FIG. 3) determines a value for a convergence parameter (step size) used in the algorithm executed in the filter module 304 based on the accuracy of the estimate $\hat{s}_1(t)$. In particular, the convergence parameter selection module selects the convergence parameter to control the adaptation speed of the filter module 304 as a non-increasing function of the echo return loss enhancement measurement.

The echo return loss enhancement measurement may be compared to a threshold value, and the convergence parameter selection module adjusts the convergence parameter based on this comparison.

Since the echo return loss enhancement measure has the property that the model accuracy is always high when the echo return loss enhancement measurement is high it may be used to slow down the adaptation speed when the echo return loss enhancement measurement is high (i.e. higher than the predetermined threshold value) in order to achieve increasingly accurate estimates, and increase the adaptation speed when the echo return loss enhancement measurement is low (i.e. lower than the predetermined threshold value) in order to quickly track changes in the model parameters.

The step-size adjustment scheme ensures that fast adaptation is achieved when the accuracy of the model is unknown (via the high updating speed when the echo return loss enhancement measurement is low), and that increasingly accurate estimates are achieved when the model is known to be accurate (via decreasing the updating speed when the echo return loss enhancement measurement is high).

In the embodiments described above, the echo removal is implemented in a VoIP system (e.g. the received audio signal may include speech of the user 102 for transmission to the user device 110 during a call between the users 102 and 108 over the communication system 100). However, the echo removal methods described herein can be applied in any suitable system in which echo removal is to be applied.

In the embodiments described above, and shown in the Figures, the echo removal module 314 implements echo suppression.

In the embodiments described above, and shown in the Figures, echo cancellation (or "echo subtraction") is not applied to the received audio signal y(t). That is, there is no echo cancellation module in the user device 104 and the echo suppression is applied to the received audio signal y(t) without a prior step of applying echo cancellation to the received audio signal y(t).

However, in other embodiments, echo cancellation may be applied, by an echo cancellation module, to the received audio signal y(t). In particular, the echo suppression applied by the echo suppression module 314 may be applied downstream of (i.e. after) the echo cancellation in the processing of the received audio signal y(t). The echo cancellation module would subtract an estimate of the echo signal from the received audio signal, but due to inaccuracies in the estimate of the echo signal, a residual echo would most-likely remain in the received audio signal. It is the residual echo that would then be suppressed by the echo suppression module 314. This echo suppression could be applied in the same way as described herein in the embodiments in which no echo cancellation is applied. If echo subtraction is used, the effect of it can be taken into account in the echo suppression.

In other embodiments, the echo removal module 314 implements echo cancellation. That is, the echo removal module 314 is arranged to subtract an estimate of the echo signal ($\hat{s}_1(t)$ or $\hat{s}_2(t)$) from the received audio signal y(t).

The methods described herein may be implemented by executing a computer program product (e.g. the client 206) at the user device 104. That is, a computer program product may be configured to remove echo in the received audio signal y(t), wherein the computer program product is embodied on a computer-readable storage medium (e.g. stored in the memory 214) and configured so as when executed on the CPU 202 to perform the operations of any of the methods described herein.

Generally, any of the functions described herein (e.g. the functional modules shown in FIG. 3 and the functional steps shown in FIG. 4) can be implemented using software, firmware, hardware (e.g., fixed logic circuitry), or a combination of these implementations. The modules and steps shown separately in FIGS. 3 and 4 and referred to in the text above may or may not be implemented as separate modules or steps. For example, the echo suppression module 314 may perform the function of the performance determination module 312. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the user devices may also include an entity (e.g. software) that causes hardware of the user devices to perform operations, e.g., processors functional blocks, and so on. For example, the user devices may include a computer-readable medium that may be configured to maintain instructions that cause the user devices, and more particularly the operating system and associated hardware of the user devices to perform operations. Thus, the instructions function to configure the operating system and associated hardware to perform the operations and in this way result in transformation of the operating system and associated hardware to perform functions. The instructions may be provided by the computer-readable medium to the user devices through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of removing echo, the method comprising:
outputting an audio signal;
receiving an audio signal, wherein the received audio signal includes echo resulting from said outputted audio signal;
modelling an echo path of the echo in the received audio signal using a first model based on the outputted audio signal and the received audio signal to determine a first model estimate of the echo in the received audio signal;
using the first model estimate to determine a first performance value according to a performance metric;
comparing the first performance value with a threshold value; and
determining if the echo path can be deemed linear based on said comparison and based on said comparison selectively:
using the first model estimate of the echo to remove the echo in the received audio signal, or
modelling the echo path of the echo in the received audio signal using a second model based on the outputted audio signal and the received audio signal to determine a second model estimate of the echo, and using the second model estimate of the echo to remove the echo in the received audio signal.

2. The method of claim 1, wherein the method comprises using the first model estimate of the echo to remove the echo in the received audio signal if it is determined that the echo path can be deemed linear.

3. The method of claim 1, wherein the method comprises modelling the echo path of the echo in the received audio signal using a second model based on the outputted audio signal and the received audio signal to determine a second model estimate of the echo, and using the second model estimate of the echo to remove the echo suppression in the received audio signal, if it is determined that the echo path cannot be deemed linear.

4. The method of claim 1, wherein the threshold value indicates a threshold accuracy and the echo path can be deemed linear when said comparison indicates the first model estimate is more accurate than the threshold accuracy.

5. The method of claim 4, wherein the comparison indicates the first model estimate is more accurate than the threshold accuracy when:
the first performance value is greater than or equal to the threshold value; or
the first performance value is greater than or equal to the threshold value for a predetermined period of time.

6. The method of claim 4, wherein the comparison indicates the first model estimate is more accurate than the threshold accuracy when:
the first performance value is less than the threshold value; or
the first performance value is less than the threshold value for a predetermined period of time.

7. The method of claim 1, wherein the performance metric is an echo return loss enhancement metric.

8. The method of claim 1, wherein the method further comprises:
using the first model estimate to determine a first model estimate of the echo power of the echo in the received audio signal; and
wherein the first performance value is determined based on the first model estimate of the echo power of the echo.

9. The method of claim 1, wherein the second model estimate of the echo is a second model estimate of the echo power of the echo in the received audio signal.

10. The method of claim 1, wherein the method comprises:
dividing the outputted audio signal and the received audio signal in a predetermined time period into a plurality of frequency sub-bands within a frequency range and implementing the method on a per frequency sub-band basis to determine if the echo path in each respective frequency sub-band within said frequency range can be deemed linear;
determining if the echo path can be deemed linear in said predetermined time period based on the number of frequency sub-bands deemed linear within said frequency range; and
using the first model estimate of the echo to remove the echo in the received audio signal if the echo path can be deemed linear in said predetermined time period, or
modelling the echo path of the echo in the received audio signal using a second model if the echo path cannot be deemed linear in said predetermined time period, and using the second model estimate of the echo to remove the echo in the received audio signal.

11. The method of claim 1, wherein the method comprises:
dividing the outputted audio signal and the received audio signal in a predetermined time period into a plurality of frequency sub-bands within a frequency range and implementing the method on a per frequency sub-band basis to determine if the echo path in each respective frequency sub-band within said frequency range can be deemed linear; and for each frequency sub-band:
using the first model estimate of the echo to remove the echo in the received audio signal if the echo path can be deemed linear, or
modelling the echo path of the echo in the received audio signal using the second model if the echo path cannot be deemed linear, and using the second model estimate of the echo to remove the echo in the received audio signal.

12. The method of claim 1, wherein:
the first model executes a first algorithm to determine filter coefficients and uses said filter coefficients to filter the outputted audio signal to determine the first model estimate of the echo; and
the second model executes a second algorithm to determine filter coefficients and uses said filter coefficients to filter the outputted audio signal to determine the second model estimate of the echo.

13. The method of claim 12, wherein the first algorithm comprises a convergence parameter and the performance metric is an echo return loss enhancement measure, the method further comprising:
updating said convergence parameter based on said first performance value, wherein the convergence parameter is selected to control an adaptation speed of the first model as a non-increasing function of the first performance value.

14. The method of claim 1, wherein:

using the first model estimate of the echo to remove the echo in the received audio signal comprises using the first model estimate of the echo to apply echo suppression to the received audio signal, thereby suppressing the echo in received audio signal; and using the second model estimate of the echo to remove the echo in the received audio signal comprises using the second model estimate of the echo to apply echo suppression to the received audio signal, thereby suppressing the echo in received audio signal.

15. The method of claim 1, wherein:

using the first model estimate of the echo to remove the echo in the received audio signal comprises using the first model estimate of the echo to apply echo cancellation to the received audio signal, wherein the first model estimate of the echo is subtracted from the received audio signal; and using the second model estimate of the echo to remove the echo in the received audio signal comprises using the second model estimate of the echo to apply echo cancellation to the received audio signal, wherein the second model estimate of the echo is subtracted from the received audio signal.

16. The method of claim 1, wherein the method is performed at a user device for use in a communication event, and wherein the received audio signal comprises speech of a user for transmission from the user device in the communication event.

17. The method of claim 16, wherein the communication event is a voice-over-internet-protocol (VoIP) call, and the outputted audio signal comprises far-end speech signals of the VoIP call which are included in the echo in the received audio signal.

18. A device comprising:

audio output apparatus configured to output an audio signal;

audio input apparatus configured to receive an audio signal, wherein the received audio signal includes an echo resulting from said outputted audio signal;

a modelling module configured to model an echo path of the echo in the received audio signal using a first model based on the outputted audio signal and the received audio signal to determine a first model estimate of the echo in the received audio signal, use the first model estimate to determine a first performance value according to a performance metric, compare the first performance value with a threshold value and determine if the echo path can be deemed linear based on said comparison, wherein the modelling module is further configured to selectively model the echo path of the echo in the received audio signal using a second model based on the outputted audio signal and the received audio signal, based on said comparison, to determine a second model estimate of the echo; and an echo removal module configured to selectively use the first model estimate or the second model estimate of the echo to remove the echo in the received audio signal based on said comparison.

19. The device of claim 18, wherein the audio output apparatus comprises a speaker configured to output the outputted audio signal, and wherein the audio input apparatus comprises a microphone configured to receive the received audio signal.

20. A computer-readable storage medium comprising instructions stored thereon that, responsive to execution by a processor, is configured to:

model an echo path of echo in a received audio signal using a first model based on an outputted audio signal and the received audio signal to determine a first model estimate of the echo in the received audio signal;

use the first model estimate to determine an echo return loss enhancement measurement;

compare the echo return loss enhancement measurement with a threshold value; and determine if the echo path can be deemed linear based on said comparison, and based on said comparison selectively:

use the first model estimate of the echo to remove echo in the received audio signal, or model the echo path of the echo in the received audio signal using a second model based on the outputted audio signal and the received audio signal to determine a second model estimate of the echo, and use the second model estimate of the echo to remove the echo in the received audio signal.

* * * * *